United States Patent [19]
Farrow et al.

[11] 3,767,054
[45] Oct. 23, 1973

[54] A FILTER TUBE CONTAINING A SELF-SEALING FILTER TUBE

[75] Inventors: Roger M. Farrow, Coxheath; Anthony B. Kimber, Iwade; John Barrington Cole, Pease Pottage; John Walter Miles, East Grinstead; Graham Ernest Griffiths, Horsham, all of England

[73] Assignee: W. R. Balston (Industrial) Limited, Maidstone, Kent, England

[22] Filed: Dec. 29, 1971

[21] Appl. No.: 213,833

Related U.S. Application Data

[62] Division of Ser. No. 46,343, June 15, 1970, Pat. No. 3,698,562.

[52] U.S. Cl.............. 210/232, 210/314, 210/488, 210/497
[51] Int. Cl............................................ B01d 27/04
[58] Field of Search.................. 210/232, 314, 317, 210/484, 488, 497; 55/378, 379, 498

[56] References Cited
UNITED STATES PATENTS

| 3,543,940 | 12/1970 | Schmidt, Jr. | 55/498 |
| 3,327,864 | 6/1967 | Ball et al. | 210/497 X |
| 3,397,794 | 8/1968 | Toth et al. | 210/488 |
| 3,064,820 | 11/1962 | Gillick, Jr. et al. | 210/484 X |

Primary Examiner—Samih N. Zaharna
Assistant Examiner—F. F. Calvetti
Attorney—Richard P. Crowley et al.

[57] ABSTRACT

A porous support core is prepared from a synthetic polymeric material, which support core is adapted for use with disposable semirigid filter tubes, which core comprises a plurality of individual elements arranged in a stacked interlocking relationship, the elements so structured to form an axial passageway in the stacke elements and flow passages in the wall of the core so formed. The individual disc elements are characterized by a central aperture to form an axial passageway, projecting partitions on one surface to form the flow passage and hook elements on the opposite surface to interlock individual disc elements.

15 Claims, 15 Drawing Figures

PATENTED OCT 23 1973 3,767,054

A FILTER TUBE CONTAINING A SELF-SEALING FILTER TUBE

This is a division of application Ser. No. 46,343, filed June 15, 1970 (now U.S. Pat. No. 3,698,562, issued Oct. 17, 1972).

BACKGROUND OF THE INVENTION

In various processes requiring filtration of a fluid stream, filter tubes are generally employed either alone or disposed about a permanent support core which is an integral part of the filter assembly. Core supports are normally employed where the pressure drop across the filter tube when in service is expected to exceed the strength of the filter tube itself. Such filter tubes and their supports are normally placed within an external filter housing. In general, the filter tubes are made to rather standard sizes and then are disposed over an internal porous support core. Material to be filtered is generally introduced externally of the tube in the housing and clarified gas or liquid removed from the internal portion of the support core. Typically, the support core is an integral part of the cartridge and is disposed of when the replacement of the filter tube is required.

Support cores presently employed are generally fabricated from a rigid open mesh material to provide porosity, such as an expanded or perforated metal. For example, a sintered porous metal cylinder is often used as a support at very high pressure differentials, while the support core may also be comprised of screen material and the like. The support cores thus employed are unitary integral cores, the body of the core generally being formed in a single operation of generally inexpensive material with the core thrown away with the filter tube with which it is used. In addition, the porosity of the support core must be carefully selected so as to provide for the proper support, while minimizing flow resistance of the fluid stream through the support core. Accord ingly, there exists a need and advantage for a support core which is easily fabricated from inexpensive materials and which offers porosity of desired characteristics, and yet which may be easily fabricated to a desired length to accomodate various filter tube lengths and wherein the filter tube only may be removed and discarded during service without the necessary removal from service or discarding of the support core.

SUMMARY OF THE INVENTION

Our invention relates to a porous core and the component elements of such core, which core composed of such elements is particularly adapted for use in supporting disposable filter tubes, a cartridge filter assembly employing said core, a method of fabricating the core and a method of employing a semirigid filter tube with such core.

More particularly, our invention concerns a generally cylindrical porous support core which is used with disposable semi-rigid filter tubes to form a filter cartridge. Our support core provides a permanent core support easily fabricated into a desired filter tube length. In combination with our support core, a disposable semi-rigid filter tube may be employed in filtering processes of high pressure differentials. Our support core is composed of readily interchanging component parts, which parts in the core are easily fabricated, particularly from solid polymers and readily assembled.

Our support cores and said support cores with semi-rigid glass fiber filter tubes are characterized in particular by excellent resistance to attack by corrosive chemicals and further, may be safely autoclaved by steam sterilization techniques with or without the filter tube. Our invention permits the porous core to be inserted into an external housing to form a filter assembly and to interchange filter tubes without disposal of the support core. Our modular core design also permits a semi-rigid filter tube to be easily slid over the porous core and to be removed when a replacement is necessary. The cover of the filter housing may be removed without interrupting or requiring resterilization of the system in which our cartridge filter assemnbly is employed. Our support core not only supports and contains the filter tube, but also by virtue of the end cap design easily and effectively seals the assembly into a housing.

The porous or open area of the support core may be varied with each design; for example, a large open area of the support core may be used to offer very low resistance to flow so that in combination with semirigid filter cartridges composed, for example, of glass fibers, outstanding permeability characteristics and high flow rate may be achieved. Another distinct advantage of our support core comprises a support core design which permits a rapid and effective fluid-tight seal to be made between the support core and the ends of the semirigid filter tube employed with the support core. This unique sealing feature is accomplished by designing the support core so that the one or more ends of the support core are adjustable inwardly after the insertion of the filter tube, so that the filter material adjacent the ends is compacted, densified or crushed in a manner sufficient to make a fluid-tight seal by the inward movement of the retaining core ends. This design of the core and technique avoids the absolute necessity of employing gaskets, sealants and the like in such filter assemblies. Where flexible cloth filter bags or fluted-type filter cartridges are employed, such axial compression is typically not possible without the necessity of employing additional sealing techniques. Our porous support core in combination with a semirigid or rigid filter tube permits the technique of axial compressing of the filter to be effective on our core.

The present invention relates to filters for filtering gaseous and liquid fluids. The invention more particularly relates to filters of the type having a filter cartridge comprising a filtering material, i.e., a filter tube, arranged around a hollow porous core. As seen from one aspect, the invention provides a hollow porous core for a filter cartridge for a filter of the above mentioned type, the core comprising a plurality of disc elements secured together or adapted to be secured together in a stack, each disc element being formed with a central aperture to define a channel through the core, and with means to leave a space between each adjacent pair of said disc elements for fluid to pass to said channel.

Preferably, each said disc element has a series of radial or substantially radial partitions to abut an adjacent disc element leaving the said space divided up into radial or substantially radial passages. Preferably each said disc element is formed with means to secure itself directly to an adjacent disc element, such, for example, as hooks, threads, adhesives, etc.

The invention also relates to a method of filtration using a filter of the above mentioned type having a filter cartridge comprising a filtering material arranged around a hollow porous core in accordance with the invention.

BRIEF DESCRIPTION OF THE DRAWINGS

The invention will be described by way of illustrative examples with reference to the accompanying drawings, wherein.

DESCRIPTION OF THE INVENTION

Figures 1, 2:
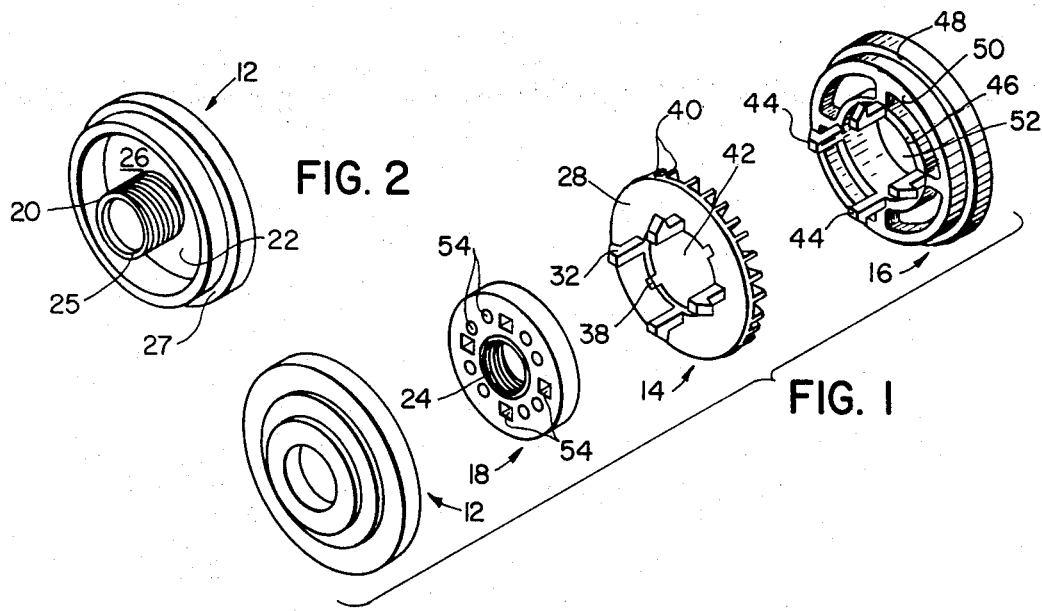
FIG. 1 is an exploded perspective view of elements of a filter core in accordance with the invention.
FIG. 2 is a perspective view from the other side of one disc element shown in FIG. 1.
Figures 3, 4, 5:
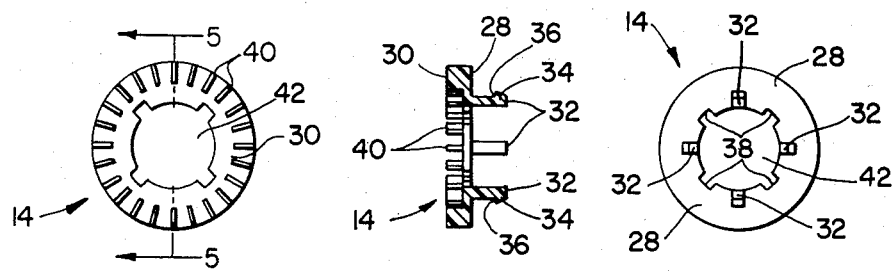
FIGS. 3, 4 and 5 are front and rear elevations and a side section (along the line 5—5 of FIG. 4) respectively of a second disc element shown in FIG. 1.
Figures 6, 7, 8:
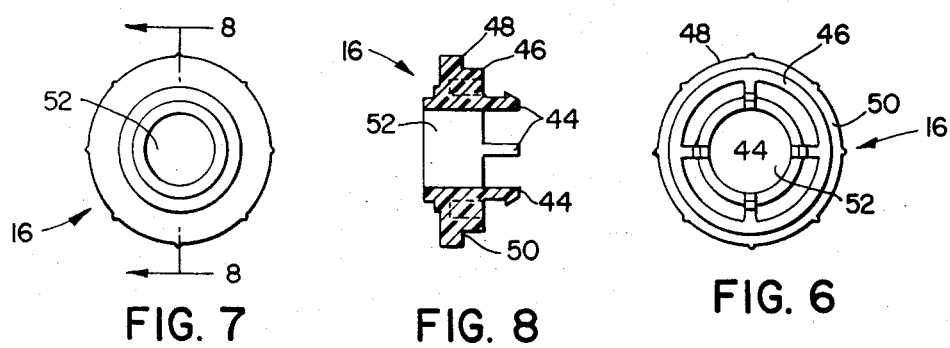
FIGS. 6, 7 and 8 are front and rear elevations and a side section (along the line 8—8 of FIG. 7) respectively of a third disc element shown in FIG. 1.
Figure 9:
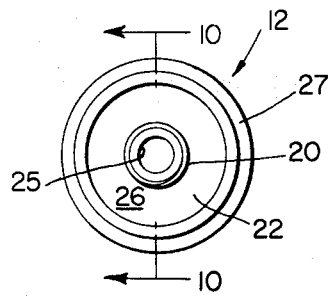
FIGS. 9 and 10 are a front elevation and side section (along line 10—10 of FIG. 9) respectively of the element shown in FIG. 2.
Figure 10:
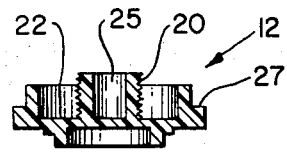
Figure 11:
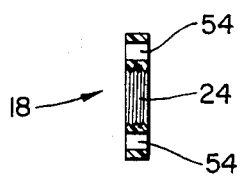
FIGS. 11 an 12 are a side section (along line 11—11 of FIG. 12) and a rear elevation respectively of a fourth element shown in FIG. 1.
Figure 12:
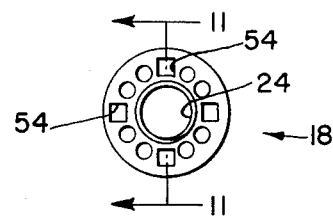

The filter core comprises a first disc element 12, (see FIGS. 1, 2, 8 and 10), a desired plurality, e.g., 31 second disc elements 14, only one of which is shown, (see FIGS. 1 and 3 to 5) a third disc element 16, (see FIGS. 1 and 6 to 8) and a fourth disc element 18, (see FIGS. 1, 11 and 12). All of these elements are of a hard synthetic polymeric material such as of moulded polypropylene.

The disc element 12 shown forms one end of the core and has no central aperture, thus preventing fluid from entering the core from that end (however, an aperture at this end may be employed as desired). An externally screw-threaded boss 20 projects from an internal face 22 of element 12, for screwing into an internall screw-threaded aperture 24 of element 18, which is received by a 1.75 inch diameter recess 25 in element 12. An inner "end face" 26 of element 12 is annular, with an external diameter of 2.00 inch. The maximum diameter of disc element 12 is 2.31 inch, where there is a rim 27. The maximum diameter of elements 12 and 16 may be increased as desired, e.g., 2.50 inches.

Each disc element 14 has an external diameter of 2.00 inch, and a thickness between faces 28 and 30 of 0.25 inch. Four "hooks" 32 project ⅜ inch from face 28 and are equally spaced around the disc element 14. Each hook 32 has a "head" portion 34 with an abutment surface 36 spaced 0.25 inch from face 28. In between the four hooks 32, there are four similarly spaced apertures 38. A plurality of the disc elements 14 are secured together in a stack by passing the hook head or engaging portions 34 of each element 14, (except the one element 14 adjacent element 18) through the receiving apertures 38 of the adjacent element 14, and twisting relatively each adjacent pair of elements 14 or otherwise receiving the elements so that the abutment surfaces 36 engage the faces 28, with a fairly tight fit. The face 30 is formed by 24 radial partitions 40 which are 5/32 inch in depth and 0.05 inch in width. These leave a space through which filtered fluid can enter or leave the core when the faces 28 and 30 of adjacent elements 14 abut. Finally, each disc element 14 has a central aperture 42, 1.00 inch diameter, to form a channel through the core 100.

The third disc element 16 forms the opposite end of the core from element 12. Element 16 has four hooks 44 corresponding in shape, dimensions and spacing to the hooks 32 of the elements 1 to engage the adjacent element 14. An inner rim 46 of element 16 is of the same diameter, 2.00 inch, as the elements 14, whilst an outer rim 48 is 2.31 inch in diameter, (the same as the maximum diameter of element 12) forming an annular ledge 50 between rims 46 and 48. Finally, the disc element 16 has a central aperture 52 of the same diameter as the aperture 42 of each element 14, to provide an outlet for filtered fluid from the centre of the core.

The fourth disc element 18 is 1.625 inch diameter to fit into the 1.75 inch diameter recess 25 in element 12. Four apertures 54 correspond to the apertures 38 of elements 14, and serve for securing element 18 to the adjacent element 14 by means of the hooks 32 thereof. Element 18 also has the ¾ inch diameter central aperture 24 mentioned earlier, to receive the threaded bolt 20 of element 12.

Figure 13:
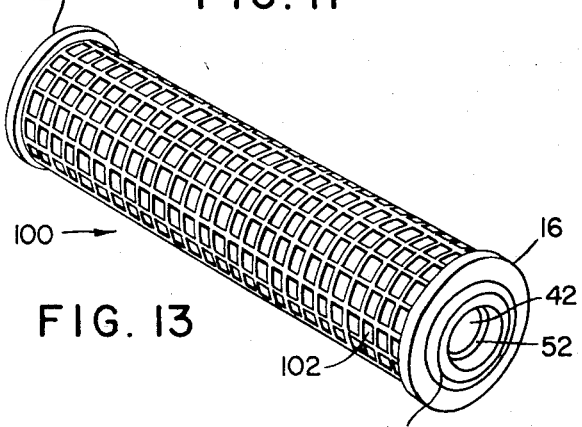
FIG. 13 is a perspective view of a support core formed by a plurality of stacked disc elements.

The elements 14, 16 and 18 of the core are all assembled by means of a jig, (not shown) which passes slidably through apertures 42, 52 and 56, whereby the individual disc elements are placed in a stacked interlocked tight relationship to form the support core of FIG. 13. Typically, the support core is supplied to the user assembled in a predetermined length and the user then fits the filter tube onto the core to form the cartridge. A preformed tube 112 (FIG. 14) of glass fiber, for example, filtering material, measuring 8.25 in length, 2.00 inch internal diameter and 2.3 inch external diameter, is fitted over elements 14 and 18 and rim 46 of element 16, to abut the ledge 50. Finally, the element 12 is screwed on to element 18, the end face 26 fitting into the tube and the rim 27 abuts the tube, holding it in place. The combination of the tube and core form a cartridge filter for use in a filter housing with an inlet for fluid to be filtered leading, for example to the outside of the cartridge and an outlet leading from the aperture 42 of the core.

The core 100 as assembled is illustrated in FIG. 13 and shown as comprising a plurality of assembled, stacked, generally fluid-tight abutting disc elements 14 making up the body of the core, the plurality of disc elements defining by the radial extending partitions 40, a pluralijy of aligned and defined flow passages 102 in the core, and a central flow passage in the core defined by an inlet 52 and a plurality of apertures 42. A sealing gasket 104 on the external face of element 16 provides a means by which the core is placed in a fluid-sealing relationship with an outlet adapted to receive the material from the central aperture 42 after filtration and to seal the core to the filter housing. Typically, the core and external disposable filter tube are surrounded by an external housing 106 (see FIG. 15) and wherein material to the filtered, particularly under pressure, is introduced into the housing and the external of the filtering material, the material filtering through the filter tube material and removed from the central aperture 42 to the outlet for the clarified fluid material. However, it is recognized and where desirable, the flow path may be reversed and material to be filtered introduced into the interior of the core and filtered material removed from the exterior thereof; that is, from the external housing.

Figure 14:
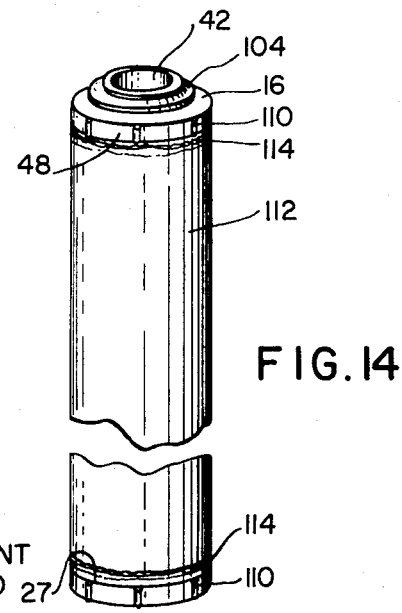
FIG. 14 is a perspective illustrative view of a filter cartridge with the support core of FIG. 13 and a semi-rigid filter tube thereon.

FIG. 14 shows a core 100 with a disposable semirigid filter tube 112 surrounding the core, the edges of each end of the tube disposed in a fluid-tight self-gasketing arrangement with the internal face surfaces 27 and 40 of elements 12 and 16 respectively of the core. Elements 27 and 40 contain about the outer edges thereof a plurality of raised projections 110 in order to permit the ends of the core 100 to be readily grasped and the element 12 to be readily turned for tightening the cartridge in the filter assembly or for removal of element 12 for replacement of the disposable tube 112. As illustrated, the tube 112 is a semirigid; this is, a self-supporting structure composed of a thin-walled porous cylinder, e.g., of many fine nonwoven glass microfibers, which fibers have been strengthened by the addition of 20 percent by weight of a resin. Typically, such tube is composed of a plurality of randomly disposed glass fibers which average 0.1 to 5.0 microns in size and wherein an epoxy resin is employed to strengthen the fibers at their cross junctions, such tube having a particle-retention rating at a 98 percent retention of particles of about 8 microns or greater in size from a fluid stream to be filtered.

The microfiber filter tube may be of any suitable length, depending upon the filter requirements. Due to the semirigid or rigid construction of the disposable tube 112 and its porosity grad the tube exhibits a self-gasketing or sealing property so that upon insertion on the support core 100 and the inward turning of the element 12, each end of the cartridge is forced against the internal face surfaces of the end caps so that axial compression of the fiber occurs as illustrated by the high density shaded area 114 (for the purposes of illustration only) in FIG. 14. The axial compression and densification of the fibers at each end accordingly, then forms a fluid-tight seal with the support core obviating the absolute necessity of employing other gasketing or sealing technique The degree of axial compression and densification of the fibers sufficient to provide a self-sealing technique will, of course, depend on the nature and extent of the particular filter tube employed. Such self-gasketing technique is particularly adapted to rigid or semirigidable porous microfiber crushable-type filter tubes, such as those filter cartridges containing organic or inorganic, natural or synthetic finely divided fibers of about 0.001 to 10 microns, e.g., 0.1 to 5.0 in average diameter, and which fibers are retained in place by the addition of, e.g. 3 to 45 percent by weight of a hardenable resin material, particularly at the cross junction of the fibers.

Figure 15:
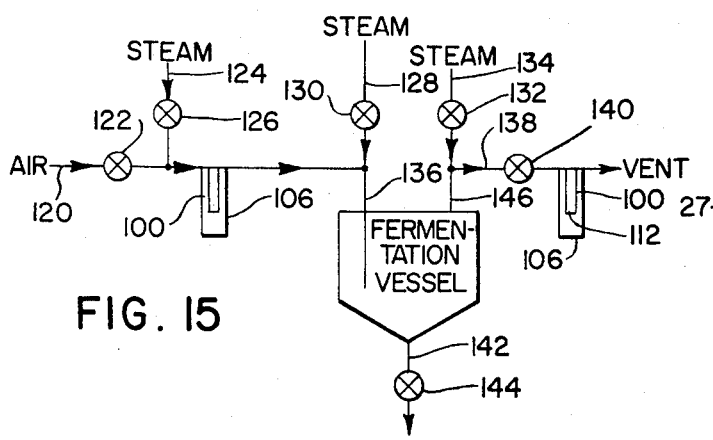
FIG. 15 is an illustrative sketch of the employment of the filter cartridge of FIG. 14 in a filter assembly used in a fermentation process.

FIG. 15 shows a fermentation apparatus which employs our filter assembly comprising the support core 100, a glass fiber tube 112, the core and the tube sealed by gasket 104 to and disposed in an external housing 106. The fermentation apparatus illustrates a fermentation vessel which contains a fermentation broth of a culture media, for example, for the biological growth or culturing of a product, such as an enzyme and a discharge line 142 with a control valve 144. Air is introduced through line 120 and control valve 122 into the fermentation vessel, line 120 including a filter assembly of the invention and disposed so that air is introduced externally of the core and cartridge with the cartridge adapted to serve as a filter for the oil particles, dust and other contaminating ingredients of the air. The filter tube is selected to remove airborne bacteria from the air stream so that sterilized air is introduced into the fermentation broth in the vessel. A steam line 124 and a control valve 126 are employed to permit in-line sterilization of the air line and cartridge filter, while steam line 128 and control valve 130 srve to introduce steam directly into the fermentation vessel as required through common line 136. In addition, steam line 134 and control valve is used in conjunction with vent line 138 and the vent control 140 to clean and to vent to common line 146 to the fermentation vessel with the vent line containing another filter cartridge of the invention.

In the fermentation process, steam is employed from line 124 to sterilize the glass fiber filter tube of the filter assembly in place prior to the introduction of air through the filter assembly through line 120. By employing the cartridge filter of the invention, the glass fiber filter tube and core after sterilization and being sealed in the line, the external housing 106 may be removed without breaking the seal of the core to the sterilized air line. In addition, in a fermentation or other process, during steam sterilization cycles, there is a possibility of back flow of ingredients from the vessel or by the steam and air through the cartridge filter. The support core and a semirigid filter tube combination permits flow in both directions through the filter without adverse effects in contrast to the use of a pleated paper-type cartridge filter which would tend to rupture. Further, the use of disc-type filters; that is, a flat sheet frame-press-type filter while suitable generally for use in one direction is difficult to support when flow may occur in both directions. Accordingly, our filter assembly permits advantages in that the filter tube can be removed without discarding the core support, flow is permitted in both directions and further, the cartridge filter may be readily sterilized by steam or other sterilizing agents, such as ethylene oxide in place.

In another use of our filter assembly, as shown in FIG. 15, the filter assembly is employed as a vent-type filter, since often during venting and fermentation or other processes, a flow may occur in both directions and which our filter assembly is able to withstand, while once again, providing access and removal of the cartridge filter without breaking the sterilized seal to the vent line.

The core and the disc elements making up the core may be composed of a variety of materials, but typically, are composed of a hard, rigid, synthetic, polymeric material which may be subject to sterilization by steam or other agents and which provides sufficient support under the conditions of use with the selected filter tube. Typical polymeric materials of which the core and its elements may be composed would include olefinic resins, such as polyethylene, polypropylene, ethylene propylene copolymers, acrylic resins, polycarbonates, and other such materials. Such polymeric materials may be further strengthened by the incorporation therein of fibrous materials, such as glass fibers.

The core element has been shown in the shape of a cylinder; however, it is recognized that diameter and length and shape may be altered as desired and that the flow passages defined by the radial partitions of the disc elements may be modified as desired to any particular size and shape commensurate with the use of the core; for example, the flow passages may define circular, square, elliptical, or other shaped flow passages which may or may not be directly aligned or disposed as shown in FIG. 13.

As illustrated, the stacked disc elements have been shown to be pointed into locking relationship through the use of hooks; however, it is recognized that a variety of means may be used to form the stack of disc elements and that such elements be replace in a permanent arrangement as desired. Typically, our disc elements are arranged and interlocked in a regular stacked arrangement by the use of a predetermined number of disc elements as required to fit the particular filter tube length to be used. Further, as illustrated, one end of the core (disc element 12) has been shown as sealed; however, it is recognized that such end may be open to permit in-line flow throughout the core. Where self-gasketing techniques are used, at least one of the end elements should be moveable axially to collapse the end of the filter tube employed.

A variety of filter materials and filter tubes of such material may be employed for use with our core and such tubes may vary in shape, depth, length, materials, porosity and strength, but in general, should be adapted to fit snugly about it and in the core. The preferred rigid and semirigid filter tubes for use with our cores are those composed of a desired porosity formed from woven or nonwoven, for example, wound round with the disposed inorganic fibers containing a resin reenforced additive, such as an expoxy resin or phenolformaldehyde resin or the like, particularly where the resin reenforces the fibers at the junctions of the fiber cross-overs. It is preferred that such cylindrically shaped filter tubes should exhibit a compressibility, i.e., be self-supporting when stood on one end so as to provide end sealing without the need of gaskets or sealing rings when employed in connection with our support cores.

Fibrous materials which may be employed in preparing filter cartridges would include, but not be limited to those natural and synthetic materials or fibers of carbon, glass, rayon, cellulose nylon, olefinic resins, cellulose, asbestos, metal fibers, polyesters and other such materials in the solid, hollow or open-cellular form; for example, glass fibers having diameters ranging from about 0.03 to 8.0 microns are commerically available and are useful in employing filter cartridges. Such filter cartridges often exhibit particle-retention ratings at their 98 percent retention rate of from about 0.3 microns of up to 8.0 microns in either a liquid or gas filteration operation.

Our invention has been illustrated with the use of a single filter tube about the core; however, where desired, any number of tubes, one over the other, may be used with the same or different function, porosity, materials, structure or other variation. For example, in the removal of oil or liquid droplets from a fluid stream like air, the first tube met by the fluid stream, e.g., the outer tube, coagulates the droplets and changes the droplet size, while the second tube, e.g., the inner tube, separates and removes the coagulated droplets, i.e., coalesces the droplets so formed.

Representative applications for glass microfiber cartridges employed in connection with our cores would include, but not be limited to: liquid clarification for the clarification of corrosive solutions and high purity metal refining; prefiltration to protect and greatly extend life of membrane absolute filters; clarification of plating solutions; clarification of hot fruit juices prior to bottling (filter can be pasteurized in place); filtration of water and solvents used in clean rooms; filtration of sterile solutions (filter can be autoclaved); final filtration of wines and spirits; protection of fine spray nozzles or orifices; and backup of precoat filters. Other representative applications would include gas filtration for sterilization of air introduced into fermenters, filtration of suspended particles from steam used for cleaning nozzles or orifices, filtration of makeup air to clean rooms and sterile areas, filtration of hot reaction gases to remove suspended precious metal catalyst particles, protection of regulators and metering devices for corrosive gases, and removal of dust from hot gas stream leaving dryer. Further, other representative applications would include solids recovery for recovery of the less-than 5 micron fraction of spent precious metal catalysts (about 10 percent of the catalyst charge in some cases) after preliminary filtration and recovery of less-than-5 micron particles of precious metals in refinery operations. In addition, another representative application employed in connection with our support cores is an extremely efficient device for dispersion of gases into liquids or the collation of liquid droplets in gas streams such as oil in air streams in the filter cartridge.

The self-supporting semirigid or rigid filter tubes employed having crushable ends may be prepared by a variety of method and materials to include preparation of paper-type cartridges by wrapping a paper about a mandrel and impregnating the paper with resin so as to form a semirigid cylindrical filter cartridge. Another technique would include vacuum-forming of a slurry of fiber into the desired form. Wheere desired, the end sections only of the tubes may contain or be sealed with a gasket or be compressible where a self-sealing gasket-type cartridge is to be used. Further, the filter tubes may be composed of open-cell foam material, particulate material such as sintered resin particles and other porous material formed into a tube.

What we claim is:

1. A cartridge filter, which filter comprises in combination:

a. a rigid, cylindrical, porous support core characterized by an axial flow passage therethrough, and further characterized by a plurality of flow passages on the cylindrical wall of the core, which flow passages provide communication between the axial flow passage and the outer wall of the support core;

b. a semirigid, cylindrical, unitary, porous, filter tube, the tube composed of a plurality of overlapping nonwoven fibers having an average diameter of from about 0.001 to 10.0 microns, the fibers having interstices thprebetween to define the porosity of the tube, the fibers containing at the junctions of the fiber crossovers a hardened material to provide a semirigid, self-supporting structure throughout the body of the filter tube, the filter tube disposed in a close-fitting relationship surrounding the support core, the fibers at the peripheral edge of each end of the filter tube adapted to be compressed together into a sealing relationship upon the application of an axial force; and c. end elements positioned at each end of the support core, the elements having outwardly extending flanges thereon extending outwardly from the surface of the core at least the thickness of the filter tube, the flanges each having a facing surface which abutts each edge of the ends of the filter tube, at least one of which end elements is adjusted in relationship with the support core for axial movement in relationship to the support core, and at least one of each end elements is adapted to be removed from the support core to permit the removal and replacement of a filter tube on the support tube, the fibers across the entire edge width of the filter tube and adjacent each facing surface compressed about the periphery by axial force due to the axial movement and position of the end elements, the fibers compressed together by being forced against the facing surface of each flange in the immediate peripheral region adjacent to the facing surface of each flange to provide a peripheral fluid-tight seal between the facing surfaces, and the body of the filter tube.

2. The cartridge filter of claim 1 wherein the semirigid filter tube is composed of a plurality of nonwoven resin reinforced glass fibers.

3. The cartridge filter of claim 1 wherein at least one facing surface of the flange is characterized by a smooth, flat, facing surface thereon adjacent and contacting the compressed edges of at least one end of the filter tube.

4. The cartridge filter of claim 1 wherein the facing surfaces are free of a gasket material, the fluid-tight seal between the facing surfaces and the edge of the filter tube being the sole seal.

5. The cartridge filter of claim 1 wherein the adjustable end element is threadably adjustable to the end of the support core.

6. The cartridge filter of claim 1 wherein each end element is threadably adjustable for axial movement to the respective ends of the support core, each end element also adapted to be threadably removable from the support core to permit the removal of the filter tube.

7. The cartridge filter of claim 1 wherein the hardened resin material comprises from about 3 to 45 percent by weight of the filter tube.

8. The cartridge filter of claim 1 wherein the fibers have an average diameter of from 0.1 to 5.0 microns.

9. The cartrige filter of claim 1 wherein:
a. the filter tube comprises glass fiber and from 3 to 45 percent by weight of a resin-hardened material;
b. each of the end elements is threadably adjusted for axial movement to the support core and removable therefrom; and
c. each of the facing surfaces of the flanges are flat and smooth, free of a gasket material between the edge of the filter tube and the facing surfaces, whereby the fluid-tight seal occurs solely by compression together at each end of the fibers of the filter tube.

10. A method of sealing a filter tube in a filter tube cartridge, the cartridge comprising:
a. a support core characterized by an axial flow passage therethrough, and further characterized by a plurality of flow passages on the cylindrical wall of the core, which flow passages provide communication between the axial flow passage and the outer wall of the support core;
b. a filter tube adapted to be placed onto the support core in a close-fitting relationship surrounding the suppore core; and
c. end elements positioned at each end of the support core, the end elements having outwardly extending flanges thereon extending outwardly from the surface of the core at least the thickness of the filter tube, which method comprises:
i. placing over the support core a semirigid, cylindrical, unitary, porous, filter tube composed of a plurality of overlapping nonwoven filters having interstices therebetween to define the porosity of the tube, the fibers containing at the junction of the fiber crossovers a hardened material to provide a semirigid, self-supporting structure throughout the body of the filter tube, the fibers having an average diameter of about 0.001 to 10.0 microns, the fibers at the region about the peripheral edge of each end of the tube adapted to be compressed together on the application of an axial force; and
ii. applying an axial force against the fibers at the peripheral edges at each end of the filter tube by the axial movement of at least one of the end elements, so as to press the facing surfaces of the flanges against the edges of the filter tube and compress the fibers together at such edges and across the entire edge width of the fiber tube and adjacent the immediate region of the facing surfaces to provide a peripheral fluid-tight seal between the facing surfaces and the body of the filter tube.

11. The method of claim 10 wherein the filter tube comprises glass fibers having an average diameter of from about 0.1 to 5.0 microns.

12. The method of claim 10 wherein the resin material comprises from about 3 to 45 percent by weight of the filter tube.

13. The method of claim 10 wherein at least one of the end elements is threadably adjustable on the support core to provide the desired axial movement, the end elements adapted to be removed from the support core for the insertion of the filter tube.

14. The method of claim 10 wherein each of the end elements is threadably adjustable on the support core, and an axial compressive force is applied to each end of the filter tube by inward turning of each end element.

15. The method of claim 10 wherein the facing surface of each flange is smooth and flat and free of a gasket material, the fluid-tight seal being solely effected by the axially compressed fibers of the filter tube.

* * * * *

UNITED STATES PATENT OFFICE
CERTIFICATE OF CORRECTION

Patent No. 3,767,054       Dated  October 23, 1973

Inventor(s)  Roger M. Farrow et al

It is certified that error appears in the above-identified patent and that said Letters Patent are hereby corrected as shown below:

In the headnote, after item "[62]", and before item "[52]", insert the following paragraph:

--Foreign Application Priority Data

June 17, 1969     Great Britain...............30646/69--

Signed and sealed this 12th day of March 1974.

(SEAL)
Attest:

EDWARD M. FLETCHER, JR.
Attesting Officer

C. MARSHALL DANN
Commissioner of Patents